April 8, 1930. H. BECKER 1,754,186
PROCESS OF MANUFACTURING DRYING VARNISHES
Filed Oct. 7, 1926
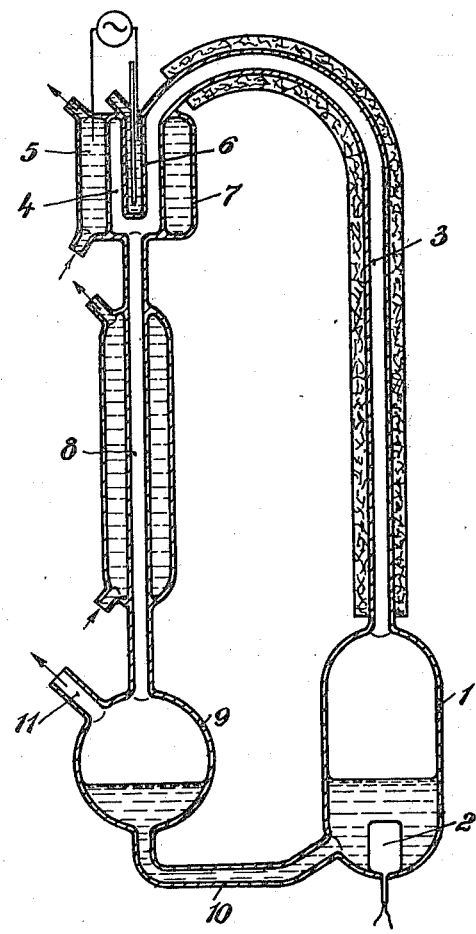
Inventor
Hans Becker
by Knight Bro.
attorneys Patented Apr. 8, 1930

1,754,186

UNITED STATES PATENT OFFICE

HANS BECKER, OF BERLIN-CHARLOTTENBURG, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

PROCESS OF MANUFACTURING DRYING VARNISHES

Application filed October 7, 1926, Serial No. 140,192, and in Germany May 20, 1925.

My invention relates to a process of manufacturing drying varnishes.

According to my invention hydrated naphthalenes, such as tetrahydronaphthalenes or decahydronaphthalenes, are exposed to an electric discharge. The result of this action is that at least one of the double benzene nuclei in the hydrated naphthalenes is broken up and unsaturated compounds are produced which dry when exposed to the air and may thus be employed as varnishes. The hydrated naphthalenes may be subjected to the electric discharges in the liquid as well as in the gaseous state. In the treatment of liquid hydrated naphthalenes the treatment in an alternating electric field has proved most satisfactory.

It has been ascertained that the yield in the treatment of hydrated naphthalenes in the liquid state rises when they are made to foam. According to my invention this may be brought about by adding to the naphthalenes before or during the treatment a substance which itself easily foams under the action of the electric discharge. Oils of high viscosity come primarily into account as such substances. Instead of easily foaming substances the product of the treatment may be admixed with the hydrated naphthalenes so that the varnish produced is not contaminated by foreign substances. Generally it suffices to add to the hydrated naphthalenes about 1 p. c. of an easily foaming substance to obtain the desired result.

Instead of treating the hydrated naphthalenes in the liquid state they may equally well be subjected to electric discharges in the vaporous state. Suitable apparatus for the treatment of the hydrated naphthalene in the vaporous state is illustrated in the single figure of the accompanying drawing.

Referring to this figure, 1 is a vessel in which the hydrated naphthalene to be treated is vaporized. In this vessel 1 is provided an electric heating device 2. At the top of this vessel 1 ascends a pipe 3, covered by an efficient lagging and which puts the vaporizer 1 in communication with an annular chamber 4. In this chamber which is interposed between the glass cylinders 5 and 6 serving as electrodes the hydrated naphthalenes evaporated in the vessel 1 are exposed to an electric discharge. In order to enable the temperature in the treatment chamber 4 to be adjusted as desired hot water is passed through the interior of the cylinder 6 and through the jacket 7. The water in the cylinder 6 and the jacket 7 is connected with the terminals of a source of alternating current and serves as connection between the electrodes. 8 is a cooling device adjoining the treatment chamber 4, 9 an intermediate vessel which communicates with the cooling device 8 and through the pipe 10 with the evaporator 1. With the branch pipe 11 of the vessel may be connected a pump by means of which the pressure in the treatment chamber 4 and the other parts in communication with it may be varied.

The apparatus functions in the following manner: The hydrated naphthalene vaporized in the vessel 1 is conducted to the treatment chamber 4 through the pipe 3 and is there subjected to the electric discharge. The product of the treatment flows mixed with the raw material to the cooling device 8, is there condensed and passed to the intermediate vessel 9. From this vessel the precipitated mixture returns to the vaporizer 1 where the raw material (tetrahydronaphthalene, decahydronaphthalene) becomes in course of the treatment gradually enriched with the product of the treatment of higher boiling point. The apparatus may, however, be so designed that the product of the treatment is passed into a separate vessel.

The speed of flow of the vapor to be treated in the chamber 4 may be varied as desired by regulating the supply of heat to the vaporizer 1. It is thus possible to adapt the electric energy acting upon a definite volume of vapor to the most favorable conditions. The condition of the vapor to be treated in the chamber 4 may also be varied by the application of heating or cooling means. By cooling, for instance, a portion of the steam may be condensed so that it is exposed to the electric glow discharges in the form of wet steam. In other cases it may be of advantage to superheat the steam. If oil or other non-conducting or badly conducting substances are employed for adjusting the temperature in the chamber 4, it is necessary to provide the cylinders 5 and 6 with special conducting materials which are then connected with the source of current.

By a judicious choice of the pressure in the entire system and the temperature in the treating chamber 4 the concentration of the vapor to be treated may be brought to a value favorable for the action of the electric discharge. It is, however, also possible to employ special diluting gases, such as nitrogen, for varying the concentration of the vapor or steam.

If instead of the electrodes consisting of dielectric metal electrodes are employed, the process described may also be carried out with direct current. In certain circumstances it may for the purpose of avoiding flashovers or arcs be advisable to employ one metal electrode only.

In the apparatus described 490 g. tetra-hydro-naphthalene were treated under the following conditions: pressure in the treating chamber 5 to 6 mm. mercury, temperature 90° C. The electrodes were connected with a source of alternating current of 500 cycles per second and a pressure of 6200 volts. The supply of heat to the vaporizer was so adjusted that the treating chamber was traversed by a vigorous stream of vapor. Duration of the treatment 6 hours. After distilling off of the raw product a yield of approximately 19 g. varnish substance was obtained.

The product obtained by the action of electric discharges upon the liquid or vaporous hydrated naphthalene is mixed with the raw material. This mixture may be directly employed as varnish, because the still admixed raw material evaporates during the drying process and the substance produced by the action of the electric alternating field remains. In order to effect a saving in the expensive raw product, the product of the treatment is according to my invention subjected to a treatment by distillation and thus separated from the admixed raw product. To employ the thus separated substance as varnish, it may be diluted by cheap solvents, such as benzene, benzol and the like.

The drying of the varnish is effected at normal or raised temperatures. To accelerate the drying process ozonized air is preferably supplied. By this treatment the time necessary for drying is reduced to about one third under certain circumstances.

Various modifications and changes may be made without departing from the spirit and the scope of the invention, and I desire, therefore, that only such limitations shall be placed thereon as are imposed by the prior art.

I claim as my invention:—

1. The process for the manufacture of drying varnishes, which consists in subjecting hydrated naphthalene to electric discharges.

2. The process for the manufacture of drying varnishes, which consists in subjecting hydrated naphthalene to electric discharges, adding the product of the treatment to more hydrated naphthalene and subjecting the mixture to electric discharges.

3. The process for the manufacture of drying varnishes, which consists in subjecting hydrated naphthalene in gaseous state to electric discharges.

4. The process for the manufacture of drying varnishes, which consists in subjecting hydrated naphthalene to electric discharges and separating the product obtained by distillation from the admixed raw product.

5. The process for the manufacture of drying varnishes, which consists in subjecting hydrated naphthalene to electric discharges, adding the product of the treatment to more hydrated naphthalene, subjecting the mixture to electric discharges and separating the product obtained by distillation from the admixed raw product.

6. The process for the manufacture of drying varnishes, which consists in subjecting hydrated naphthalene in gaseous state to electric discharges and separating the product obtained by distillation from the admixed raw product.

In testimony whereof I affix my signature.

HANS BECKER.